May 7, 1957  L. P. EVANS  2,791,543
METHOD OF MAINTAINING SUBSTANTIALLY CONSTANT CATALYST ACTIVITY
Filed July 24, 1952  2 Sheets-Sheet 1

INVENTOR.
LOUIS P. EVANS
BY Francis J. Johnston
AGENT

United States Patent Office 2,791,543
Patented May 7, 1957

2,791,543
METHOD OF MAINTAINING SUBSTANTIALLY CONSTANT CATALYST ACTIVITY

Louis P. Evans, Woodbury, N. J., assignor to Socony Mobil Oil Company, Inc., a corporation of New York Application July 24, 1952, Serial No. 300,636

4 Claims. (Cl. 196—50)

The present invention relates to catalytic reforming and, more particularly, to catalytic reforming employing a static bed.

The present invention relates to catalytic reforming. As is generally well-known in the art, reforming is the designation given to those reactions which are specifically known as dehydrogenation, isomerization, and dehydrocyclization. Reforming as practiced can involve anyone or all of the foregoing specific reactions and generally does as practiced in the treatment of mineral oil fractions such as naphtha and the like.

Three general manipulative methods are known. That is to say, the catalyst can be handled as a moving bed, as a static bed or as fine particles circulated through the system. The present invention is concerned with that method of handling the catalyst generally known as the static bed or the bed in situ method.

In the static bed type of operation, masses of catalyst are confined in two or more reactors. That is to say, a quantity of catalyst is placed in each of two or more reactors and the reforming reaction with its concomitant coking of the catalyst and reactivation thereof carried out in each reactor.

In a static bed operation the activity of the catalyst decreases in a non-linear manner after each reactivation or regeneration until the activity of the catalyst has decreased from the original that for all practical purposes it is no longer desirable to regenerate the catalyst. At this point in the life of the catalyst, the entire contents of the catalyst case is dumped and the catalyst case filled with fresh active catalyst. As a consequence of this method of handling the catalyst, the catalyst activity is always diminishing. In other words, during the interval in which a catalyst charge remains in the case, the activity of the catalyst is constantly changing and is not substantially constant.

For such constantly changing catalyst activity there must be compensatory changes in operating variables such as charge stock inlet temperature, residence time and the like. As the catalyst ages and the activity decreases, more and more drastic changes in operational variables must be made to compensate for decreased catalyst activity or conversion efficiency must be sacrificed.

Figure 1:
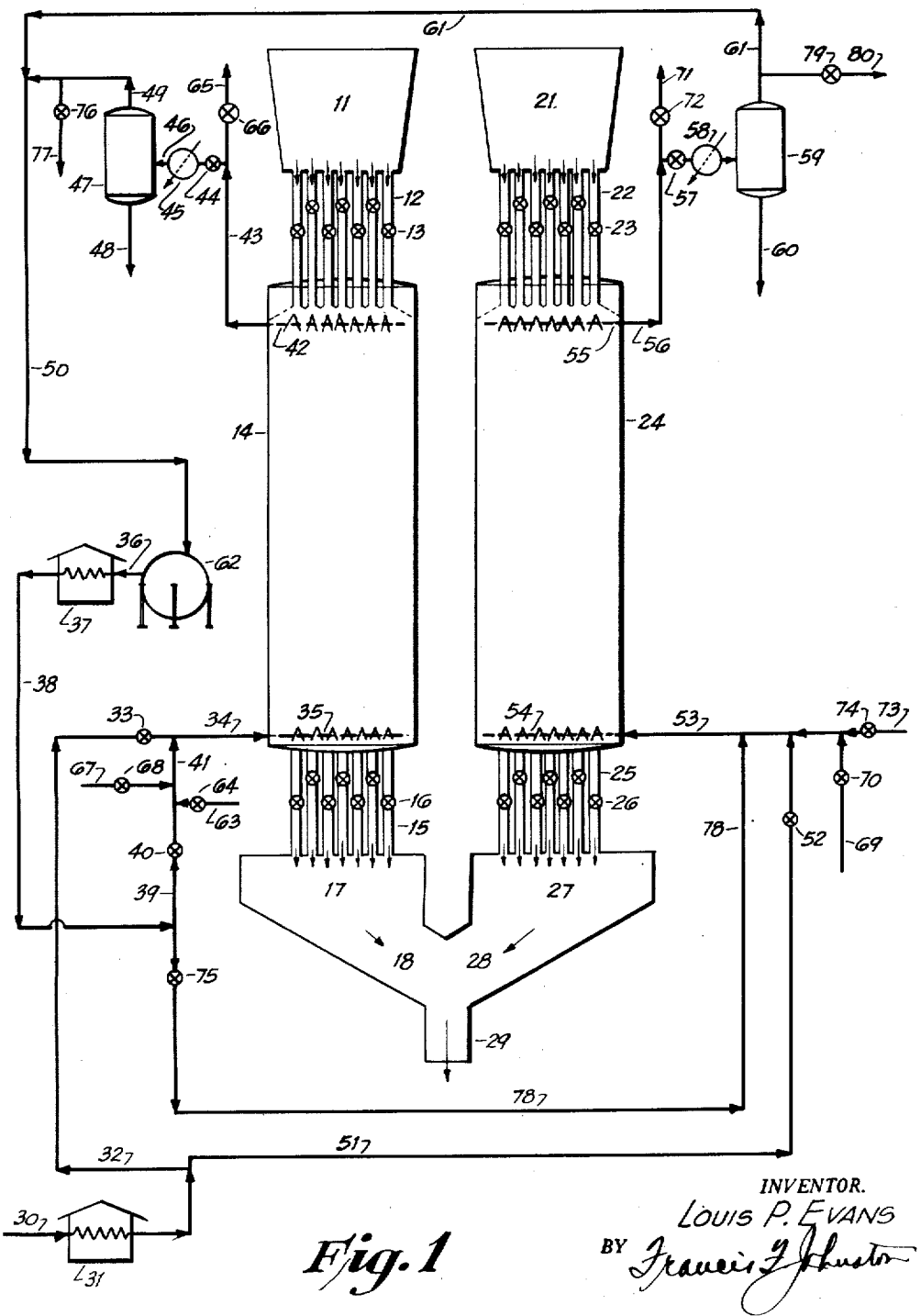
Figure 2:
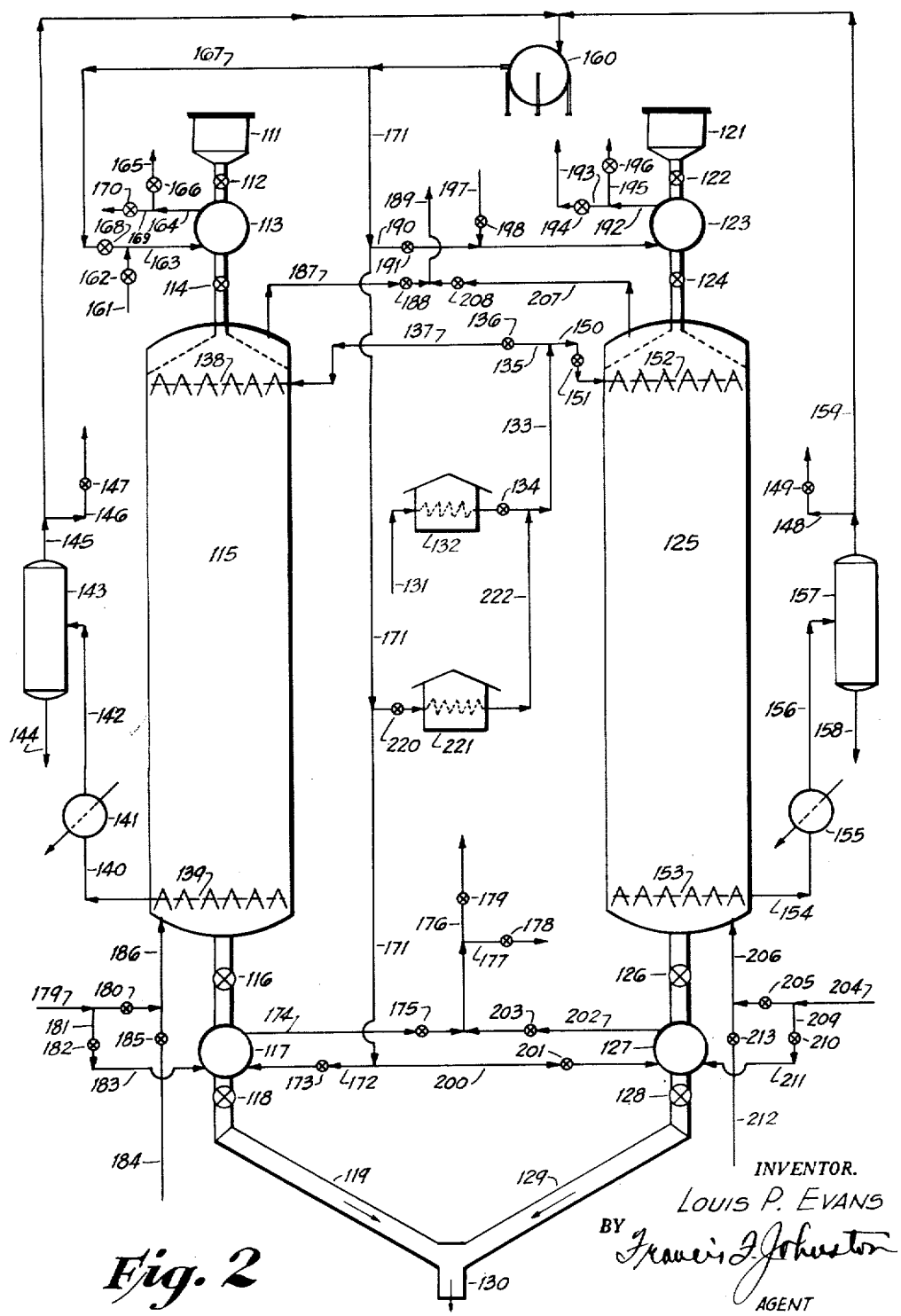

It has now been discovered that the aforesaid difficulties can be overcome and the activity of the catalyst maintained substantially constant at all times in a surprisingly simple manner. Accordingly, it is an object of the present invention to provide a method for reforming hydrocarbon mixtures containing hydrocarbons capable of undergoing at least one of the molecular changes, isomerization, dehydrogenation and dehydrocyclization in the presence of a static bed of particle-form solid catalyst while maintaining the activity of the catalyst substantially constant. It is another object of the present invention to provide a method of operating a static-bed, catalytic-reforming reaction in which the catalyst activity is maintained substantially constant through a plurality of regenerations. It is a further object of the present invention to provide a method of reforming hydrocarbon mixtures employing a static catalyst bed in which the activity of the catalyst is maintained substantially constant through a plurality of regenerations and deactivations wherein the decrease in activity of the catalyst is compensated in a simple but efficacious manner. Other objects and advantages will become apparent to those skilled in the art from the following description taken in conjunction with the drawings in which Figure 1 is a schematic illustration of a method of reforming a mixture of hydrocarbons employing two static catalyst bed reactors wherein the decrease in catalyst activity is compensated at atmospheric pressure; and Figure 2 is a schematic illustration of a method of reforming a mixture of hydrocarbons employing two static catalyst bed reactors wherein the decrease in catalyst activity is compensated at super-atmospheric pressure.

Catalytic reforming is achieved in the presence of a catalyst capable of bringing about one or more of the molecular changes, isomerization, dehydrogenation and dehydrocyclization at elevated temperatures of about 800° to about 1100° F. While any suitable reforming catalyst can be used, it is presently preferred to use a reforming catalyst comprising at least about 70 mol percent alumina and about 18 to about 30 mol percent chromia.

The reforming reaction can be carried out in the presence or absence of hydrogen or a hydrogen-containing gas. It is presently preferred to use a hydrogen-containing gas comprising about 25 to about 80 percent preferably about 35 to about 60 percent hydrogen and the balance $C_1$ to $C_6$ hydrocarbons. Even when reforming a hydrocarbon mixture in the absence of hydrogen, it is desirable to employ a heat carrying vapor such as a recycle gas. Accordingly, the reforming reaction is carried out in the presence of about 1 to about 15, preferably about 4 to about 10, mols of gas per mol of hydrocarbon mixture, and when employing hydrogen to use about 1 to about 8, preferably about 2 to about 5, mols of hydrogen per mol of hydrocarbon mixture. The average molecular weight of the hydrocarbon mixture is determined in the usual manner from the A. S. T. M. distillation.

The reforming reaction can be carried out at pressures of about 15 to about 600 p. s. i. a. and preferably at about 200 to about 300 p. s. i. a.

The hydrocarbon mixture to be reformed is heated to about 800° to about 1100° F., and preferably to about 900° to about 1050° F. before entering the catalyst case or reactor.

The recycle gas whether containing at least 25 percent hydrogen or less is heated to about 900° to about 1300° F. and preferably to about 1000° to about 1200° F. or to such a temperature that when mixed with the charge stock, i. e., the hydrocarbon mixture to be reformed, in the ratio of about 1 to about 15, preferably 4 to about 10, mols of gas or about 1 to about 8 mols, preferably about 2 to about 5 mols of hydrogen per mol of hydrocarbon mixture to form a charge mixture, the charge mixture enters the catalyst case or reactor at a temperature of about 800° to about 1100° F. and preferably about 900° to about 1050° F.

Referring now to Figure 1. In Figure 1 a method of reforming a hydrocarbon mixture such as a virgin naphtha, a cracked naphtha or a mixture of virgin and cracked naphthas in which the charge mixture flows upwardly is schematically illustrated. Thus, active catalyst is accumulated in feed hopper 11, flows through conduits 12 under control of valves 13, and fills catalyst case 14 to the level shown. The valves 13 are then closed as are valves 16 in conduits 15.

The catalyst case or reactor 14 then is purged with an inert and/or non-flammable gas such as flue gas by drawing an inert and/or non-flammable gas such as flue gas from a source not shown through pipe 67 under control of valve 68. The flue gas passes through pipes 41 and 34 with valve 33 closed into distributor 35 in catalyst case 14.

Distributor 35 is of any suitable type whereby vapors of charge mixture or gas, such as the aforesaid flue gas, can be distributed over the cross-section of catalyst case 14.

The flue gas rises through case 14 displacing any air therein and is vented through collector 42, line 43 and pipe 65 under control of valve 66 with valve 44 closed. When the case has been purged it is ready for use in the reforming operation.

A hydrocarbon mixture containing hydrocarbons capable of undergoing at least one of the molecular reformations, isomerization, dehydrogenation and dehydrocyclization such as a virgin naphtha is drawn from a source not shown through line 30, heated in furnace 31 to about 750° to about 1050° F. and presently preferred to about 850° to about 950° F. and the heated charge stock discharged into line 32 with valve 52 in line 51 closed.

A heat carrier such as a recycle gas, and presently preferred a recycle gas containing about 25 to about 80 percent preferably about 35 to about 80 percent hydrogen, is drawn from holder 62 through pipe 36, heated in furnace 37 to about 900° to about 1300° F. preferably about 1000° to about 1200° F. and discharged into pipe 38.

The heated charge stock passes through line 32 under control of valve 33 into line 34. The heated recycle gas passes from pipe 38 into pipes 39 and 41, with valve 40 open and valves 64, 68 and 75 closed and thence into line 34 where it is mixed with the charge stock in the ratio of about 1 to about 8 mols, preferably about 2 to about 5 mols, of hydrogen or about 1 to about 15, preferably about 4 to about 10, mols of recycle gas per mol of charge stock to form a charge mixture.

The heated charge mixture passes through line 34 to distributor 35 and enters the catalyst case at a temperature of about 800° to about 1100° F. and preferably about 900° to about 1050° F.

The vaporous charge mixture rises through the catalyst case being reformed in its passage therethrough and at the same time laying down a carbonaceous deposit on the particles of catalyst.

The charge mixture is passed through the case at a space velocity of about 0.1 to about 6, and preferably about 0.5 to about 2, volumes of liquid charge stock per hour to provide a residence time of about 0.5 to about 100, and preferably about 2 to about 50 seconds.

The reformate and gas together make the case effluent which is withdrawn from catalyst case 14 through collector 42 and line 43 with valve 66 closed and valve 44 open and passed through condenser 45 and line 46 to liquid-gas separator 47.

In liquid-gas separator 47 the condensed effluent is withdrawn through line 48 to stabilizers, fractionators and the like to after-treatment, storage and distribution. The uncondensed effluent in liquid-gas separator 47 escapes through pipe 49 and thence through pipe 50 to holder 62. The net make gas is vented from pipe 49 through pipe 77 under control of valve 76 to the refinery gas plant or fuel system.

After treatment of a given quantity of charge stock, the activity of the catalyst is reduced sufficiently to require regeneration. Accordingly, the case is purged with an inert and/or non-flammable gas such as flue gas before regenerating the catalyst.

The purge gas is drawn from a source not shown through pipe 67 and passed therefrom under control of valve 68 through pipes 41 and 34 to the distributor 35 in catalyst case 14. The purge gas is vented through collector 42, pipe 43 and pipe 65 with valve 44 closed and valve 66 open.

The catalyst is deactivated with a carbonaceous deposit generally termed coke which can be removed by combustion in a stream of combustion-supporting gas such as air. Air is drawn from a source not shown through pipe 63 under control of valve 64 and passed through pipes 41 and 34 to distributor 35 and thence upwardly through the mass of catalyst particles in case 14. In passage through the catalyst mass, the air supports combustion of the coke and the latter is burned-off the catalyst. The flue gas so produced is vented through collector 42 and pipes 43 and 65 under control of valve 66. Thereafter, the catalyst in case 14 is ready for the reforming step in the cycle.

While the catalyst in case 14 is being regenerated, active catalyst in case 24 is being used to reform the same or a different charge stock. Reactor or catalyst case 24 is similar to case 14 being provided for charging at atmospheric pressure with active catalyst in bin 21.

The active catalyst flows through conduits 22 under control of valves 23 and with valves 26 in conduits 25 closed, the case is filled with catalyst to a predetermined level. Valves 23 are then closed and the case purged with an inert and/or non-flammable gas such as flue gas.

The purge gas is drawn from a source not shown through pipe 73 under control of valve 74 with valves 75, 52 and 70 closed. The purge gas is passed through pipe 53 to distributor 54 in case 24.

Distributor 54 is of any suitable type whereby vapors or gases can be distributed over the cross-section of case 24.

The purge gas flows upwardly from distributor 54 through case 24 driving such air as is therein with it. The purge is vented through collector 55 and pipes 56 and 71 with valve 57 closed and valve 72 open.

Collector 55 is of any suitable type whereby vapors and/or gas can be collected and drawn-off from the cross-section of case 24.

Valves 74 and 72 are closed and a charge stock drawn from a source not shown through line 30 is heated in furnace 31 and discharged through line 51 under control of valve 52 to line 53. The charge stock is heated in furnace 31 to a temperature below a thermal reforming temperature, say about 750° to about 1050° F. and preferably about 850° to about 950° F.

A gaseous heat carrier which can comprise about 25 to about 80 percent preferably about 35 to about 60 percent hydrogen and the balance $C_1$ to $C_6$ hydrocarbons when the reforming reaction is to be carried out in the presence of hydrogen or contain less or no hydrogen when the reforming reaction is to be carried out in the absence of hydrogen is drawn from a holder 62 through pipe 36 and heated in furnace 37 to a temperature such that when mixed in the ratio of about 1 to about 15, preferably about 4 to about 10, mols of gas or in the ratio of about 1 to about 8, preferably about 2 to about 5, mols of hydrogen per mol of charge stock, the charge mixture so formed enters case 24 at a temperature of about 800° to about 1100° F. and preferably about 900° to about 1050° F. In general, the gas leaving furnace 37 has a temperature of about 900° to about 300° F. and preferably about 1000° to about 1200° F.

The heated gas is discharged from furnace 37 through pipe 38 and with valve 40 closed and valve 75 open passes through pipe 78 to line 53 where it is mixed with heated charge stock from line 51 to form a charge mixture having a temperature of about 800° to about 1100° F. and preferably about 900° to about 1050° F.

The charge mixture passes through line 53 to distributor 54 and flows upwardly through case 24 coming in effective contact with the active catalyst therein. The reformate, charge mixture gas and make gas form the effluent which leaves case 24 through collector 55 and line 56 with valve 72 closed and valve 57 open to pass to condenser 58 and thence to liquid-gas separator 59.

In liquid-gas separator 59 the condensate is withdrawn through line 60 to stabilizers, fractionators and aftertreatment and thence to storage and/or distribution.

The uncondensed effluent is withdrawn from liquid-gas separator 59 through pipe 61, the net make gas being vented through pipe 80 under control of valve 79.

As with the catalyst in case 14, during the reforming step of the cycle, the catalyst in case 24 becomes contaminated with coke. To regenerate the catalyst, the coke is burned off in a combustion-supporting gas.

Accordingly, when the activity of the catalyst is decreased to a point requiring regeneration introduction of the charge mixture to case 24 is stopped and a purge gas such as flue gas introduced into case 24 from a source not shown through pipe 73 under control of valve 74 with valves 75, 52 and 70 closed. The purge gas flows through pipe 53 and distributor 54 into case 24. The purge gas flows upward through case 24 and is vented through collector 55 and pipes 56 and 71 with valve 57 closed and valve 72 open.

After purging, combustion-supporting gas such as air is drawn from a source not shown through pipe 69 with valve 70 open and valves 75, 52 and 74 closed. The combustion-supporting gas passes through pipe 53 and distributor 54 into case 24. The combustion-supporting gas flows upwardly through case 24 in effective contact with the coked catalyst whereby the coke is burned off and the catalyst regenerated.

The flue gas so produced is vented through collector 55, and pipes 56 and 71 with valve 72 open and valve 57 closed. The case is then ready for the reforming step of another cycle.

It has been the practice in the past when operating static catalyst beds to regenerate and coke the catalyst without renewal of the catalyst until the activity of the catalyst upon regeneration is below that of a practically usable catalyst. When the activity of the catalyst has decreased to such a point, the entire catalyst charge of the case is discharged to waste. Such a mode of operation results in a decrease in activity during the practical catalyst life which must be compensated continually by increasing the residence time and/or the charge mixture temperature or by other means. This results in irregular performance and variation in the important characteristics of the product together with yield losses. These difficulties are overcome by operation in accordance with the principles of the present invention.

In the drawing Figure 1, the catalyst cases there represented are suitable for operation at pressures of 15 to 60 p. s. i. a. although it is preferred to operate at pressures of about 100 to about 300 p. s. i. a.

In accordance with the principles of the present invention, the catalyst in cases 14 and 24 is not used until incapable of regeneration to a practical activity level and then the entire contents of the case dumped, but in contrast, a portion, say about 5 to about 10 percent, of the contents of the catalyst case is dumped at intervals of say about a week to about a month and an equivalent amount of fresh active catalyst introduced into the catalyst case. In other words, a small portion of the catalyst contents of the case is removed at intervals, the amount of catalyst withdrawn, the amount of fresh active catalyst introduced and the interval between withdrawals and complementary additions being such as to maintain a substantially constant catalyst activity at all times. Since the catalyst activity is substantially constant at all times, no adjustments in the severity of reforming conditions such as residence time, charge mixture, temperature, and the like are required.

Although the catalyst cases 14 and 24 operate at superatmospheric pressures, provision has been made for withdrawal and addition of catalyst at times when the catalyst case is at atmospheric pressure. The catalyst is withdrawn at intervals of such duration that the withdrawn catalyst is relatively completely spent. That is to say the withdrawn catalyst activity is such that it does not justify regeneration by any simple means such as by air. The withdrawn catalyst is discarded. Catalyst cases 14 and 24 are provided with withdrawal conduits 15 and 25 respectively, provided with valves 16 and 26 respectively. During a period when the catalyst case is at atmospheric pressure, for example during regeneration or during purging valves 16 or 26, as the situation requires, are opened and a small amount, say about 3 to about 10 percent, of the catalyst in case 14 or 24 as the situation requires, is drawn off into hopper 17 or 27. The withdrawn catalyst in hopper 17 or 27 flows along chute 18 or 28 to discharge 29 to waste. During withdrawal of spent catalyst or thereafter, fresh active catalyst is introduced into case 14 or 24 from feed hopper 11 or 21 in an amount sufficient to replace that which was withdrawn.

The replacement catalyst flows from hopper 11 or 21 through conduits 12 or 22 under control of valves 13 or 23 into cases 14 or 24 respectively. The valves 13 and 16 or 23 and 26 are closed and the case is ready for operation at substantially the same catalyst level as that at which the case had been operating prior to the withdrawal and replacement of the portion of catalyst.

Thus, a small portion of spent catalyst, i. e., spent with respect to regeneration by simple means such as air regeneration is withdrawn and replaced by an equivalent weight of active catalyst in such amounts and at such intervals as to maintain the overall catalyst activity substantially constant.

Figure 2 is a schematic illustration of a method of operating a plurality of static catalytic beds in alternating reforming and regenerating periods in which the catalyst can be withdrawn and replaced while the catalyst case is at super-atmospheric pressure. The operating temperatures and pressures are within the limits set forth hereinbefore, the charge stocks are hydrocarbon mixtures of the class defined hereinbefore and the products are similar. It is to be noted that whereas in Figure 1 cases 14 and 24 are piped for introduction of the charge mixture near the bases of the cases and removal of the products of the reaction near the tops of the cases, in Figure 2 cases 115 and 125 are piped for introduction of the charge mixture near the tops of the cases and removal of the products of the reaction from points near the bottom of the cases. Either cases can be fitted for a flow the reverse of that depicted.

In the following description, since the cases are substantial duplicates, the operation of one with reference to the corresponding part of the other by number will reduce the description thereof. The description of the method of operating cases 115 and 125 will begin at a point at which it is necessary to withdraw a portion of the catalyst and replace the withdrawn portion with fresh active catalyst in order to maintain the overall activity of the catalyst contents of cases 115 and 125 substantially constant.

Thus, at any time in the cycle, i. e., during reforming, purging, regenerating, catalyst can be removed from case 115 (125) which is under elevated pressure of say 100 to 300 p. s. i. a. in the following manner. Depressuring chamber 117 (127) is purged with an inert and/or non-flammable gas such as flue gas drawn from a source not shown through pipes 179 (204), 181 (209) and 183 (211) with valve 182 (210) open and valve 180 (205) closed as is valve 173 and vented therefrom through pipes 174 (202) and 176 with valves 175 (203) and 179 open and valve 178 closed.

After purging chamber 117 (127), a suitable gas such as recycle gas is used to pressurize depressuring chamber 117 (127) to the pressure of case 115 (125). Thus, a recycle gas drawn from holder 160 through pipe 171 is passed through pipe 172 under control of valve 173 into chamber 117 or through pipe 200 under control of valve 201 into chamber 127. With valve 175 (203) closed, the pressure in chamber 117 (127) is raised to that of case 115 (125). Then gas-tight valve 116 (126) is opened and a predetermined quantity of catalyst admitted to depressuring pot 117 (127).

The quantity of catalyst withdrawn from case 115 (125) is sufficient that when replaced with fresh active catalyst the overall activity of the catalyst in case 115 (125) will be substantially that steady value established previously in the case life of the particular mass of catalyst in case 115 (125).

Gas-tight valve 116 (126) is closed and the depressuring chamber 117 (127) vented through pipes 174 (202) and 176 until control of valves 175 (203) and 179. After the pressure in chamber 117 (127) has been reduced to atmospheric, chamber 117 (127) is purged with an inert and/or non-flammable gas as described hereinbefore. The purged catalyst is then discarded by opening gas-tight valve 118 (128) and allowing the catalyst to flow through chute 119 (129) to discharge to discard 130.

The quantity of spent catalyst discarded is replaced by a like quantity of fresh active catalyst. Gas-tight valve 112 (122) is opened and a predetermined quantity of fresh active catalyst equivalent to that withdrawn is admitted from hopper 111 (121) into chamber 113 (123). The sealing and catalyst transfer means and the catalyst in chamber 113 (123) are purged by passing a purge gas drawn from a source not shown through pipes 161 (197) and 163 (190) with valve 162 (198) open and valve 168 (191) closed into chamber 113 (123). The purge is vented through pipes 164 (192) and 165 (195) with valves 166 (196) open and valve 170 (194) closed.

The pressure in chamber 113 (123) is then raised to at least that of case 115 (125) by admitting a suitable pressuring gas such as recycle gas to chamber 113 (123).

Recycle gas is drawn from holder 160 through pipes 167 (171) and passed through pipe 163 (190) under control of valve 168 (191) with valves 162 (198) closed. Valves 166 (196) and 170 (194) also being closed. When the pressure in chamber 113 (123) is that of case 115 (125) valve 168 (191) is closed and gas-tight valve 114 (124) opened. The catalyst then flows into case 115 (125). The pressure in chamber 113 (123) is reduced to atmospheric by venting the residual gas therefrom through pipes 164 (192) and 169 (193) under control of valve 170 (194).

The charge stock is drawn from a source not shown through line 131, heated in furnace 132 and discharged into line 133 under control of valve 134.

A suitable gaseous heat carrier or a hydrogen-containing gas such as recycle gas is drawn from holder 160 through pipe 171 under control of valve 220 and heated in furnace 221. The heated gas is discharged into line 222 and thence into line 133 wherein it is mixed in the desired proportion with the charge stock to provide a charge mixture.

The charge stock and gas are mixed in the ratio of 1 to 15, preferably 4 to 10, mols of recycle gas or 1 to 8 mols, preferably 2 to 5 mols, of hydrogen per mol of charge stock to form a charge mixture which enters case 115 (125) at a temperature of about 800° to about 1110° F. and preferably about 900° to about 1050° F.

The charge mixture passes through line 133 into line 135 and thence under control of valve 136 (151) into line 137 (150) and to distributor 138 (152).

Distributor 138 (152) is of any suitable type whereby the charge mixture can be distributed over the cross-section of case 115 (125).

The charge mixture vapor flows downward and out of case 115 (125) through collector 139 (153) line 140 (154) through cooler 141 (155) and line 142 (156) to liquid-gas separator 143 (157).

In liquid-gas separator 143 (157) the condensed hydrocarbons are withdrawn through line 144 (158) to stabilizers, fractionators, after-treatment storage and/or distribution. The uncondensed effluent from case 115 (125) leaves liquid-gas separator 143 (157) by pipe 145 (159) and thence to gas holder 160.

The net gas make when operating case 115 is vented from pipe 145 through pipe 146 under control of valve 147. When operating case 125 the net gas make is vented from pipe 159 through pipe 148 under control of valve 149.

Thus, in accordance with the principles of the present invention at intervals of one or more weeks or months, or in general at intervals such that the overall activity of the catalyst remains substantially constant, a small portion say about 3 to about 10 percent and preferably about 5 to about 7 percent of the catalyst is removed from case 115 (125) and replaced with an equivalent amount of fresh active catalyst thereby maintaining the overall catalyst activity substantially constant.

I claim:

1. A method of operating a static catalyst bed to maintain the over-all activity of the catalyst thereof substantially constant which comprises filling a reactor with active catalyst, in a cyclic manner passing heated vapors of a hydrocarbon through said reactor in contact with said catalyst whereby coke deposit is laid down on said catalyst and burning off said coke deposit, without substantial addition of catalyst repeating the aforesaid steps of said cycle until a steady over-all catalyst activity is attained, without substantial addition of catalyst continuing to repeat said cyclic operation until said steady over-all catalyst activity begins to decrease, withdrawing a portion, substantially less than the total volume, of said catalyst and replacing said withdrawn portion of catalyst with an equal volume of active catalyst, the volume of catalyst withdrawn and the volume and activity of replacement catalyst being sufficient to maintain said steady over-all catalyst activity.

2. A method of operating a static catalyst bed to maintain the over-all activity of the catalyst thereof substantially constant which comprises (1) filling a reactor with active catalyst, (2) reacting hydrocarbon vapors in the presence of said catalyst until the reaction rate decreases, (3) regenerating said catalyst, without substantial addition of catalyst repeating the aforesaid steps (2) and (3) in a cyclic manner while establishing a substantially constant over-all catalyst activity until said substantially constant over-all catalyst activity decreases, withdrawing about 3 to about 10 percent of said catalyst from said reactor, adding an equivalent volume of active catalyst, the quantity and activity of said added catalyst being sufficient to maintain the aforesaid over-all catalyst activity substantially constant, and continuing in a cyclic manner without intermediate substantial additions of catalyst to react hydrocarbon vapors in the presence of said catalyst, to regenerate said catalyst, to remove a portion, substantially less than the total volume, of catalyst and to replace said removed catalyst with active catalyst having an activity sufficient to maintain said over-all catalyst activity substantially constant.

3. A method of reforming hydrocarbons over a static catalyst bed which comprises (1) filling a reactor with active reforming catalyst, (2) without substantial addition of catalyst, passing heated naphtha vapors through said reactor in contact with said catalyst until the rate of conversion of said catalyst decreases, (3) regenerating said catalyst, (4) without intermediate substantial addition of catalyst, repeating steps 2 and 3 in a cyclic manner through about 40 to about 200 cycles, (5) removing about 3 to about 10 percent of said catalyst from said reactor, (6) adding a substantially equal amount of catalyst to said reactor, the activity and quantity of added catalyst being sufficient to restore the over-all activity of said catalyst to that which it was prior to the fortieth to about two hundredth cycle, (7) without intermediate substantial additions of catalyst, repeating steps 2 and 3 in a cyclic manner, (8) without further intermediate substantial additions of catalyst, after about 20 to about 100 cycles repeating steps 5 and 6, to maintain the over-all catalyst activity substantially constant, and (9) discarding said withdrawn catalyst.

4. A method of reforming hydrocarbons over a static catalyst bed which comprises (1) filling a reactor with active reforming catalyst and, in a cyclic manner, (2) passing heated naphtha through said reactor in contact with said catalyst, (3) regenerating said catalyst, (4) without substantial addition of catalyst, repeating steps 2 and 3 for about two weeks to about two months until the over-all activity of said catalyst after regeneration decreases, (5) withdrawing about 3 to about 10 percent of said catalyst from said reactor, (6) adding a substantially equal amount of active catalyst of greater activity than said over-all activity, (7) resuming the cycle of steps 2 and 3, (8) without intermediate substantial addition of catalyst at intervals of about one week to about one month, repeating steps 5 and 6, the amount and activity of said added catalyst being sufficient to maintain the over-all catalyst activity substantially constant, and (9) discarding said withdrawn catalyst.

References Cited in the file of this patent

UNITED STATES PATENTS 2,456,035     Wobker _____ Dec. 14, 1948

UNITED STATES PATENT OFFICE
CERTIFICATE OF CORRECTION

Patent No. 2,791,543                                                  May 7, 1957

Louis P. Evans

It is hereby certified that error appears in the printed specification of the above numbered patent requiring correction and that the said Letters Patent should read as corrected below.

Column 7, line 14, for "until" read --under--; line 64, for "$1110°$ F." read --$1100°$ F.--.

Signed and sealed this 22nd day of October 1957.

(SEAL)
Attest:
KARL H. AXLINE

Attesting Officer

ROBERT C. WATSON
                                        Commissioner of Patents